(12) United States Patent
Nahar

(10) Patent No.: US 8,310,403 B2
(45) Date of Patent: Nov. 13, 2012

(54) ANTENNA ATTACHMENT SCHEME FOR MOUNTING AN ANTENNA TO A METER

(75) Inventor: Rathindra Nahar, Suwanee, GA (US)

(73) Assignee: General Electric Company, Schenectady, NY (US)

(*) Notice: Subject to any disclaimer, the term of this patent is extended or adjusted under 35 U.S.C. 154(b) by 118 days.

(21) Appl. No.: 12/862,827

(22) Filed: Aug. 25, 2010

(65) Prior Publication Data
US 2012/0049021 A1  Mar. 1, 2012

(51) Int. Cl.
*H01Q 1/04* (2006.01)

(52) U.S. Cl. ... 343/719; 343/872; 343/873; 340/870.02; 361/679

(58) Field of Classification Search ............ 343/719, 343/872, 873; 340/870.02; 361/659, 679
See application file for complete search history.

(56) References Cited

U.S. PATENT DOCUMENTS

| | | | |
|---|---|---|---|
| 6,072,405 A * | 6/2000 | Sears | 340/870.02 |
| 6,172,616 B1 | 1/2001 | Johnson et al. | |
| 6,378,817 B1 * | 4/2002 | Bublitz et al. | 248/200 |
| 6,414,605 B1 * | 7/2002 | Walden et al. | 340/870.02 |
| 7,202,828 B2 * | 4/2007 | Zehngut et al. | 343/719 |
| 7,692,600 B1 | 4/2010 | Pakosz et al. | |
| 7,800,890 B1 | 9/2010 | Therrien et al. | |
| 2004/0061623 A1 | 4/2004 | Tootoonian et al. | |
| 2004/0264302 A1 * | 12/2004 | Ward, II | 368/90 |
| 2005/0052328 A1 | 3/2005 | De Angelis | |
| 2006/0284784 A1 | 12/2006 | Smith et al. | |

FOREIGN PATENT DOCUMENTS

| | | |
|---|---|---|
| WO | 02088642 A1 | 11/2002 |
| WO | 2006/138631 A2 | 12/2006 |
| WO | 2006138631 A2 | 12/2006 |

OTHER PUBLICATIONS

New Zealand Office Action issued in connection with NZ Application No. 594677, Aug. 24, 2011.
EP Search Report for application EP 11176775.

* cited by examiner

*Primary Examiner* — Tho G Phan
(74) *Attorney, Agent, or Firm* — Ernest G. Cusick; Frank A. Landgraff (57) ABSTRACT

An antenna attachment scheme is provided, according to one aspect of the invention, for mounting an antenna to a meter. The antenna attachment scheme comprises a housing mountable to a meter. The housing comprises a top surface; an open-end; and a side surface. The side surface of the housing comprising a mounting surface for the antennae to the housing.

16 Claims, 7 Drawing Sheets

ANTENNA ATTACHMENT SCHEME FOR MOUNTING AN ANTENNA TO A METER

BACKGROUND OF THE INVENTION

The subject matter disclosed herein relates generally to antennas and more specifically to a device for mounting an antenna to a utility meter.

For many years, utility companies have employed meters for determining utility usage such as gas, water, and electricity for a particular household. These meters displayed utility usage in relevant units and were attached to the outside of the customer's home. Meters were displayed in this fashion so that employees from the utility companies could check and determine usage for billing purposes over fixed intervals. However, due to certain limitations, utility company employees had to physically visit a meter in order to record relevant data, resulting in a time consuming, labor intensive, and costly process.

Aside from being cumbersome, there were several other drawbacks to manual meter reading. For example, occasional expected human error would result in an erroneous reading of a meter, resulting in an inaccurate billing statement to a customer. Another example is the time consuming process of manually transferring meter readings into a database so that accounting departments could calculate a customer's required payment. Therefore, these inherent disadvantages in manual meter reading led to the development of automatic meter reading (AMR) technology.

AMR technology allows utility companies to automatically collect usage data from a household and transfer that information to a database for billing calculations. An integral component of an AMR module is the antenna that transmits local meter data to the service providers. Antennas can be mounted to the outside of the main structure of the meter mostly with adhesives, tapes, screws, or other mechanical means. Because AMR modules benefit from low cost, reliable, and easy removability and mounting of antennas, a device that accomplishes these goals may be desirable.

BRIEF DESCRIPTION OF THE INVENTION

An antenna attachment scheme is provided, according to one aspect of the invention, for mounting an antenna to a meter. The antenna attachment scheme comprises a housing mountable to a meter. The housing comprises a top surface; an open-end; and a side surface. The side surface of the housing comprising a mounting surface for the antennae to the housing.

Another aspect of the present invention provides an antenna attachment scheme for mounting an antenna to a meter, the antenna attachment scheme comprises a housing mountable to a meter. The housing comprises a top surface; an open-end; and a side surface. The side surface of the housing comprising a mounting surface for the antennae to the housing, wherein the side surface of the housing further comprises a recess for mounting an antenna.

An antenna attachment scheme for mounting an antenna to a meter, the antenna attachment scheme comprises a housing mountable to a meter. The housing comprises a top surface; an open-end; and a side surface. The side surface of the housing comprising a mounting surface for the antennae to the housing, wherein the side surface of the housing further comprises a recess for mounting an antenna. The side surface of the housing further comprises a recess for mounting an antenna, and the side surface comprising a flange for mounting the antenna to the housing and the antenna comprises a strip antenna. The recess is provided in the side surface of the housing, and the recess comprises an antenna aperture. The antenna aperture comprises antenna aperture recess legs in a configuration to receive a T-shaped antenna.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

Embodiments of the present invention are directed to a device for mounting antennas of varying configurations to utility meters. The device, as embodied by the invention, should be low in cost, easily removable, and provide adequate reception for the antenna.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Utility meter antennas may be mounted to the meter with various antenna attachment schemes. These antenna attachment schemes include but are not limited to adhesives, tapes, screws, or other mechanical attachment schemes. Although effective, there are some consequences inherent in employing such attachment schemes. For example, adhesives and tapes may have non-desirable long-term properties, including when subjected to environments at temperature extremes, moisture, and/or where ultraviolet or infrared light is present. Also, production handling and cleanliness due to an adhesive's ability to collect dirt and other particulate matter may be undesirable. For antenna attachment schemes utilizing mechanical connections such as screws, tie-downs, locks, and the like may require special tools to facilitate attachment and removal of the antenna.

Further, there may also be a limited amount of space in between a meter and a meter cover in which to mount the antenna. Therefore, the antenna attachment schemes, as embodied by the invention, provides a housing having antenna mounts for overcoming the consequences of previous antenna mountings means, providing effective attachment, spatially efficient mounting with an ease of antenna attachment and mounting.

In this application and according to embodiments of the invention, "substantially cylindrical" means cylindrical, but with some evidence of ridges, abscesses, imperfections, such as those from manufacturing, or other like structures that would disrupt a "cylindricality" of the housing in the antenna attachment scheme. Further, "substantially planar" means planar, but, as above, with some evidence of ridges, abscesses, imperfections from manufacturing, or other structures that would disrupt a "planarity" of the housing in the antenna attachment scheme.

Figure 1:
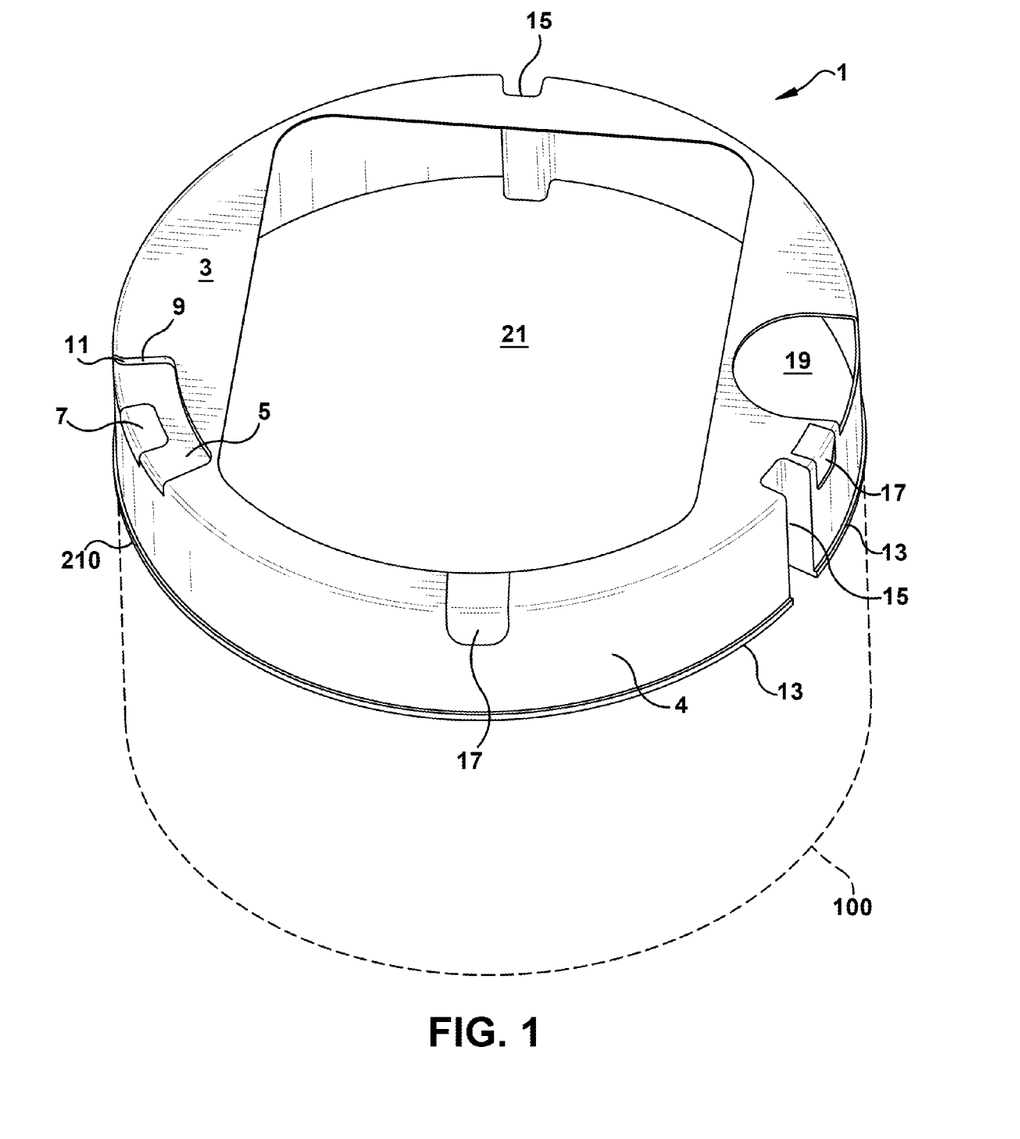
FIG. 1 is an overall perspective view of an exemplary embodiment of the invention.

Referring to FIG. 1, the antenna attachment scheme, as embodied by the invention, comprises a housing 1. The housing 1, as embodied by the invention, may be formed of any suitable size and configuration for facilitating the mounting of antennas. The housing 1, as embodied by the invention, also provided for ease of removal of the housing 1 from a meter 100 (illustrated in phantom in FIG. 1 for ease of understanding of the antenna attachment scheme, as embodied by the invention). In an exemplary embodiment, the housing 1 can be substantially cylindrical in nature (as described above) and comprise an open-end 210, a top surface 3 opposite the open-end 210, and a side surface 4.

Side surface 4 may or may not form a closed loop. For example, and in no way limiting of the invention, the meter 100 is substantially cylindrical in nature; the structural circumference of the housing 1 can be less than 360°. The open end 210 may be any suitable size so that it may surrounds at least a portion of the meter 100.

For example, in the antenna attachment scheme, as embodied by the invention, the housing 1 may fully encapsulate a meter 100. Alternately, the housing 1 may encapsulate ¼, ⅓$^{rd}$, ½ or more of the meter 100, up to and including fully encapsulating the meter 100, i.e., a fully 360° in circumference. Also, the housing 1 may be supported to the meter 100 by mechanical means, such as, but not limited to, hooks, retention straps, connectors, and the like, where a meter 100 generally comprises other support structures on its periphery.

The top surface 3 of the housing 1 may be substantially planar (as discussed above) and is located opposite the open end 210. The housing 1, as embodied by the invention, may be formed from any suitable material, such as an electrically insulation material, including but not limited to plastics, ceramics and the like. These materials are merely exemplary and are not intended to limit the invention in any manner.

Further, the housing 1 for the antenna attachment scheme, as embodied by the invention, may be formed to be opaque or transparent materials. If housing 1 is so constructed of an opaque material, any viewing of the meter 100 outputs may be impeded. Therefore, a top surface aperture 21 of the housing 1 of the antenna attachment scheme, as embodied by the invention, may be located within top surface 3. The top surface aperture 21 of the housing 1 of the antenna attachment scheme facilitates viewing of the meter 100 outputs. Furthermore, a battery aperture 19 may be located within top surface 3, where the battery aperture 19 can allow for removal of a battery from a meter 100 without separating housing 1 from the meter 100.

The housing 1 of the antenna attachment scheme, as embodied by the invention, comprises a flange 13 (FIG. 1). The flange 13 is generally peripherally disposed around the open end 210 of the housing 1. Flange 13 can be located around the periphery, either disposed around only a portion or part of the periphery or disposed around an entire periphery of the open end 210 of the housing 1, as embodied by the invention. The flange 13 is intended and designed for receiving an antenna (not illustrated in FIG. 1 for ease of illustration). This purpose may be accomplished, for example, by having the flange 13 protruding perpendicularly from the side surface 4.

Alternatively, as embodied by the invention, the flange 13 may have an L-shaped cross section. Moreover, the flange 13 may have any other configuration to support the antenna, for example, but not limited to "U" or "V" shaped. Also, the flange 13 may comprises one for more slits (not illustrated) for the antenna to pass through for support and retention of the antenna to the housing 1. In the antenna attachment scheme, as embodied by the invention, the flange 13 may receive the antenna where a first portion of the L-shaped cross section, which is substantially parallel to the side surface 4, may secure the antenna to the housing 1. Moreover, a clearance is provided between the side surface 4 of the housing 1 and the first portion of the L-shaped cross section may be an appropriate distance to secure the antenna in the antenna attachment scheme.

The antenna attachment scheme, as embodied by the invention, may comprise one or more tabs 17. Each tab 17 is associated with the housing 1 and further secures the antenna to the housing 1. The tab 17 may, for example, be a separate tabular structure coupled to the housing, or the tab 17 may be partially "cut out" from the housing 1 and comprising an integral hinge for integrally hinging the tab to the housing 1. With the tab 17 only being partially cut out from the housing 1, tab 17 may freely rotate about its integral hinge to secure an antenna to the housing 1 in the antenna attachment scheme, as embodied by the invention.

Further, a recess 5 may also be located within a surface of the housing 1. The recess 5 is intended to receive a different configuration antenna compared to one that fits around the periphery of the housing 1, as discussed above. The recess 5, as embodied by the invention, may be of any suitable length, width, and depth for receiving an antenna. Furthermore, the recess 5, as embodied by the invention, may be located within a first side of the top surface 3 establishing a recess face. An antenna aperture 7, to be discussed in further detail later, may then be within the recess face. The depth of the recess 5 may also establish at least one recess sidewall 11. At least one recess sidewall aperture 9 may then be provided adjacent to the antenna aperture 7. The at least one recess sidewall aperture 9, as embodied by the invention, can be within the at least one recess sidewall 11.

Embodiments of the antenna attachment scheme, as embodied by the invention, further comprise structure or means for preventing rotation of the housing 1 about a meter 100. This prevention may be accomplished through several structures or means including, but not limited to, at least one side recess 15 disposed within the side surface 4 of the housing 1. The at least one side recess 15, as embodied by the invention, is connectable with a meter 100 to secure the same to each other. For example, and in no way limiting of the structure of the invention, the at least one side recess 15 can be located within a first side of side surface 4, and at least one side recess 15 may be connectable with a matching slot (not illustrated) within the meter 100.

Further, as illustrated in FIG. 1, the at least one side recess 15 can be located along the entire width of side surface 4. The at least one side recess 15, in this aspect of the invention, may be formed in any suitable size and configuration as long as it is connectable with a meter 100. For example, the at least one side recess 15 may be a small indentation, which can be connectable with a matching slot within the meter 100 or it may engage itself with the surface of the meter 100 where it creates sufficient pressure between the housing 1 and meter 100 to prevent rotation therebetween. Furthermore, mechanical means for preventing rotation may be utilized, such as, but not limited to, pins, screws, bolts, detents, adhesives, or the like or combinations thereof.

Figure 2:
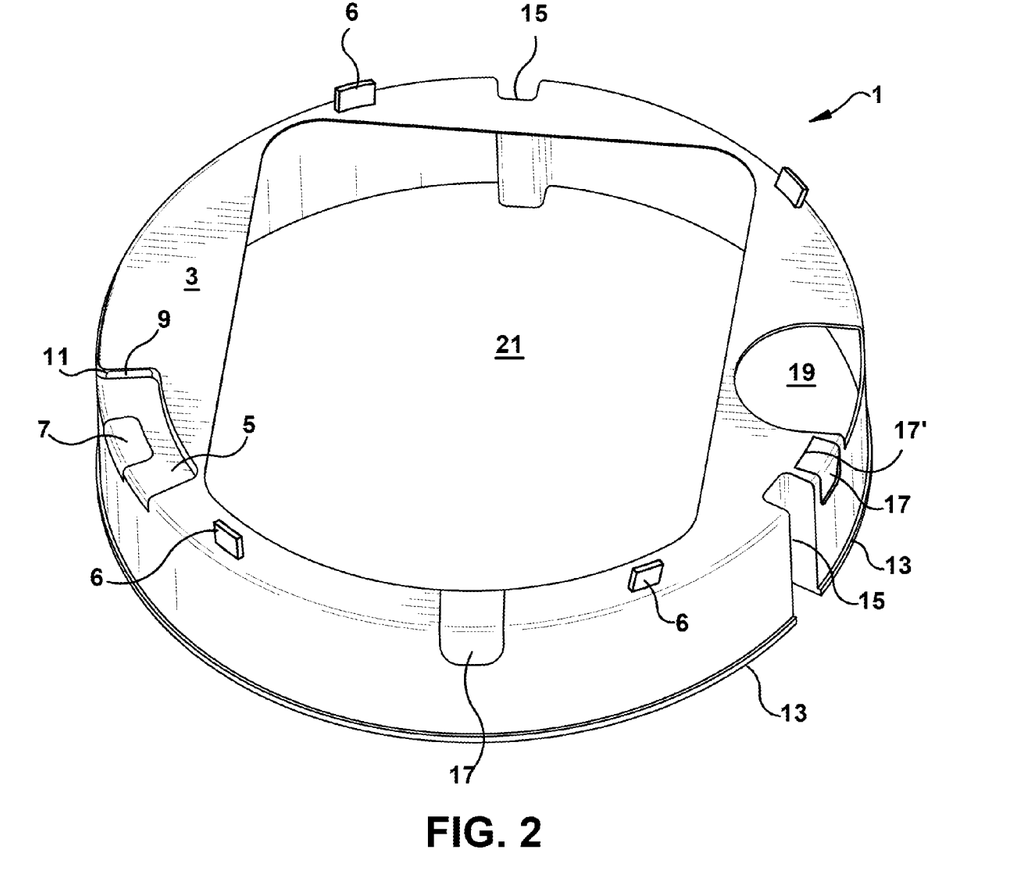
FIG. 2 is an overall perspective view of another exemplary embodiment of the invention.

The antenna attachment scheme in FIG. 2 is substantially similar to FIG. 1, except in this embodiment, structures for preventing the housing 1 from being dislodged from a meter 100 are provided. As will be understood better in the discussion of FIGS. 3 and 4, a gap is provided between a meter's cover and the housing 1 when the components of antenna attachment scheme, as embodied by the invention, are fully joined together. The gap is defined by dimensional differences and the overall nesting of the housing 1 and the meter 100 so the housing 1 can fit on the meter 100. In order to prevent the housing 1 from being dislodged from the meter 100, structures or mechanical means may be provided. For example, as embodied by the invention, an object may be disposed within the gap between the meter cover and top surface of the housing, or the base of the housing at the open end may be coupled to the meter.

As illustrated in FIG. 2, at least one spacer 6 may be coupled to the top surface 3 of the housing 1. The spacer 6 bridges the gap between a meter top cover 200 (FIG. 3) and the top surface of the housing 1. The meter top cover 200 comprises a top surface 201, side surface 202 and open bottom 203. The meter top cover 200 has an overall size and configuration to nest over the housing 1. Each of the at least one spacers 6 may protrude for example but in no way limiting of the invention, protrude substantially perpendicularly from the top surface 3 of the housing 1 to the underside of top surface 201 to engage therewith, thus spacing the meter top cover 200 from the housing 1. Each of the at least one spacers 6 may be of any suitable size or configuration, where the at least one spacers 6 may all be of the same size and shape or of different sizes and shapes. Furthermore, the at least one spacers 6 may be individual protrusions, as illustrated in the Figures, or provided as a single spacer disposed around a portion of the periphery of the top surface 3 of the housing 1.

Figure 3:
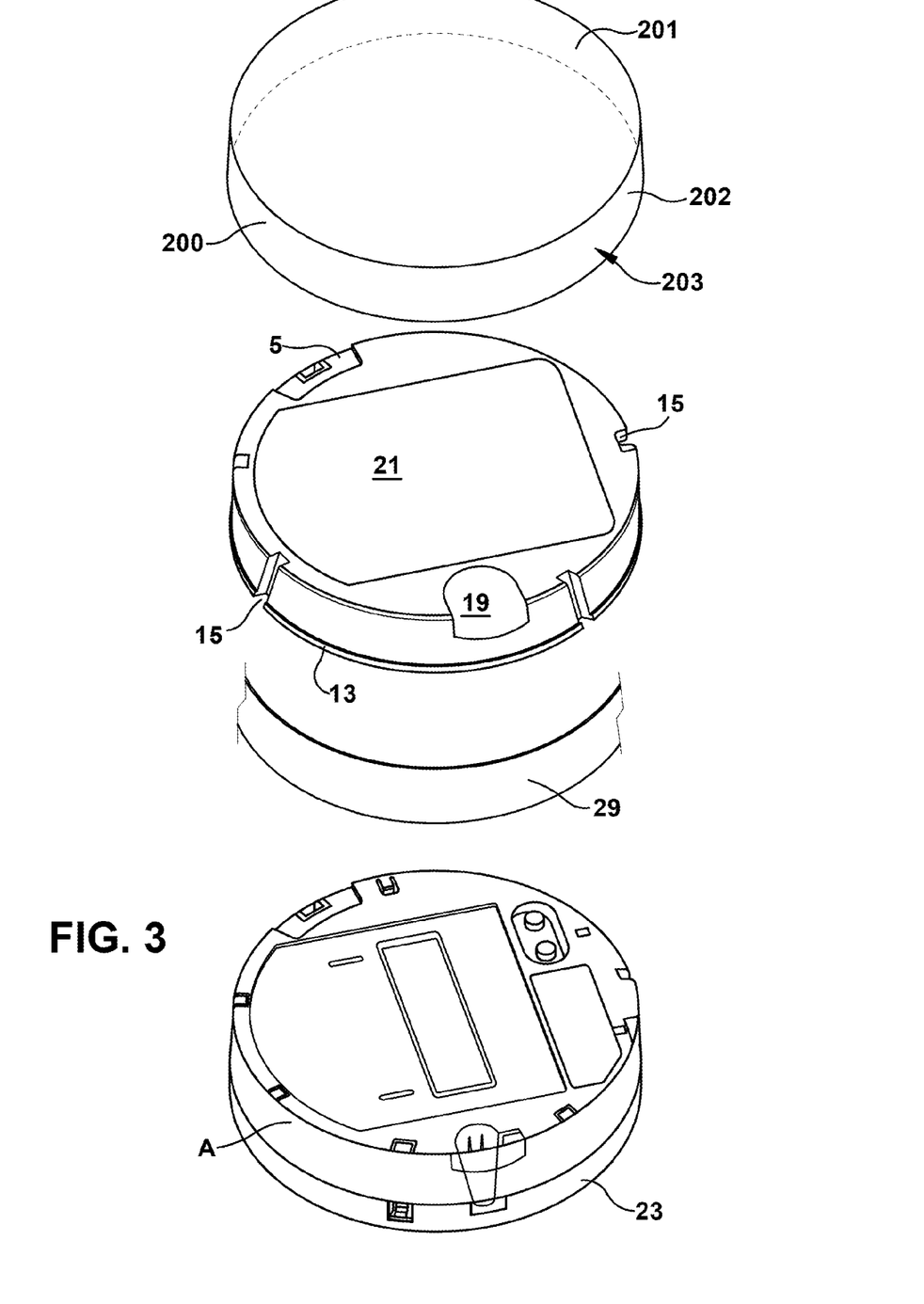
FIG. 3 is a perspective "exploded" view of a meter cover, antenna mount device, and utility meter prior to assembly.
Figure 4:
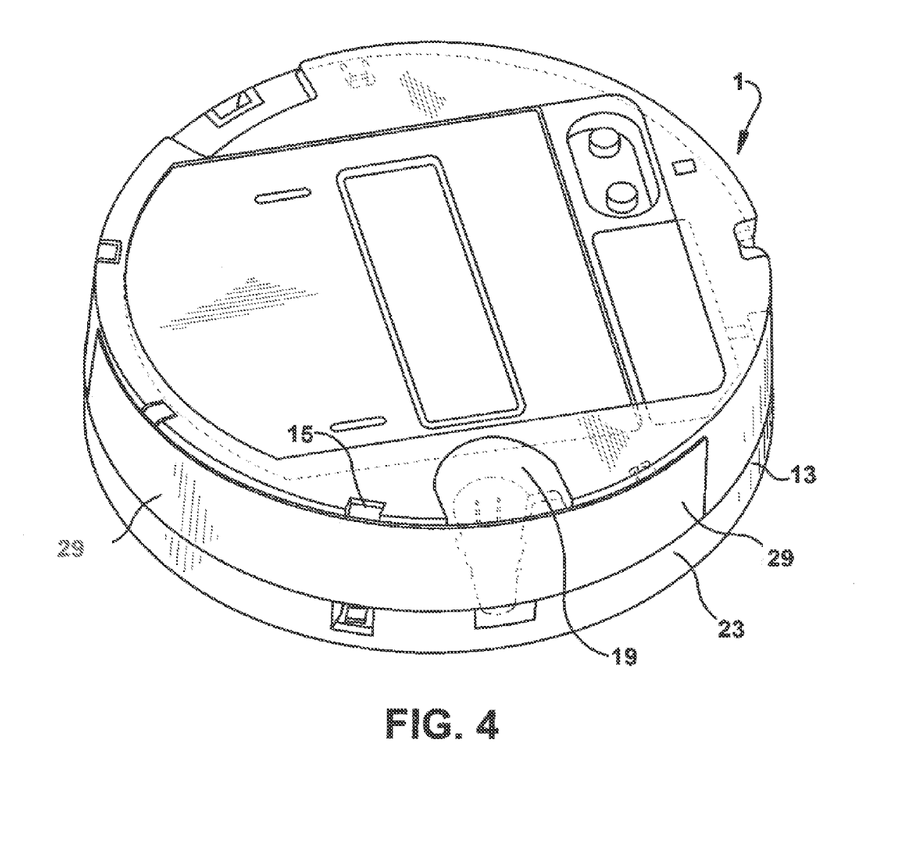
FIG. 4 is a perspective view of a meter assembly of FIG. 3.
Figure 5:
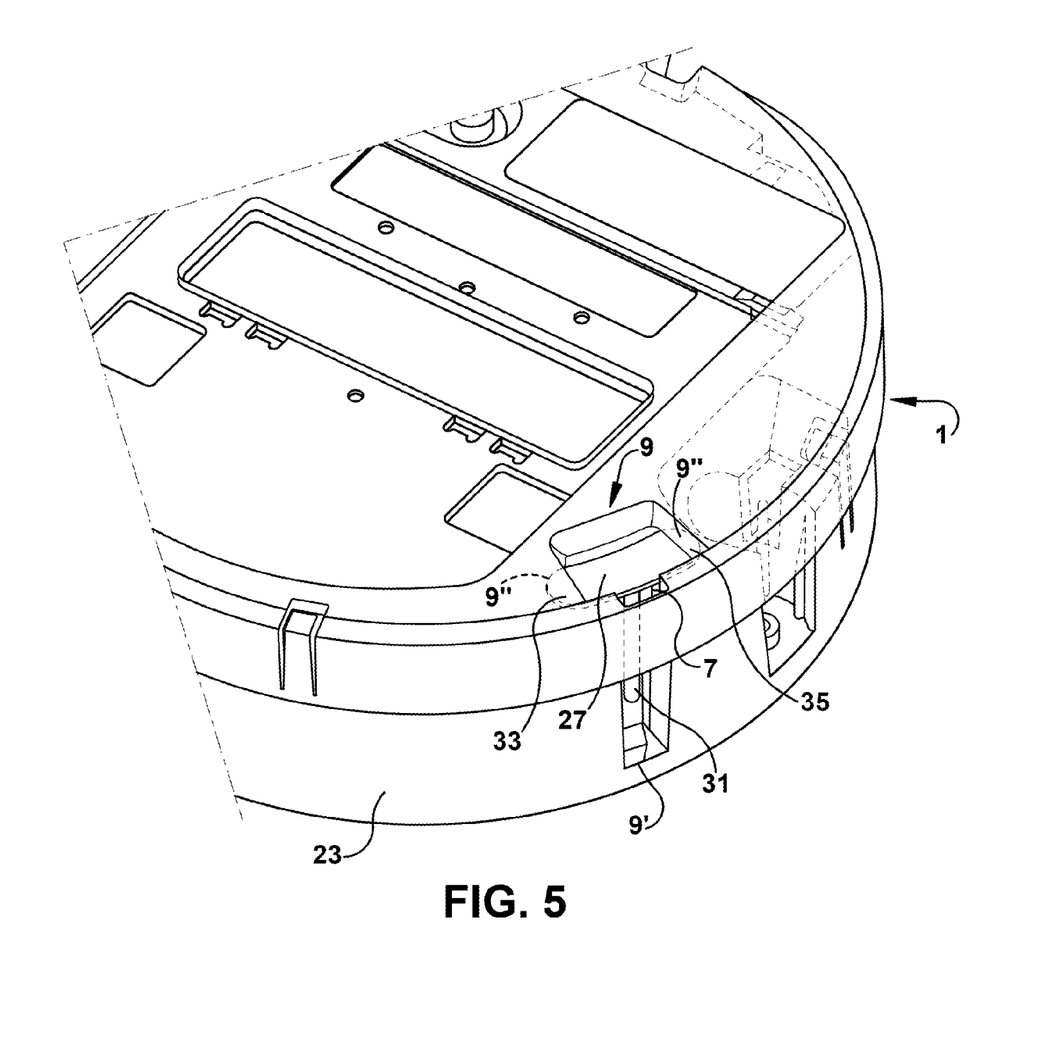
FIG. 5 is an exploded view of T-shaped antenna mounted according to an embodiment of the invention.

FIGS. 3 and 4 depict components of the antenna attachment scheme and meter assembly in an exploded view (FIG. 3) and as assembled (FIG. 4), respectively. More specifically, the housing 1, as embodied by the invention, may first be connected to the meter 100 followed by the meter cover 25. As shown in FIG. 5, a gap 75 between meter cover 25 and the housing 1 is defined therebetween. Further, as discussed above, spacers 6 may be utilized to bridge the gap between the meter cover 25 and the top surface of the housing 1. Furthermore, in exemplary embodiments of the invention, housing 1 may conform to the shape of a meter 100 in order to compensate for the limited space in between the meter 100 and meter top cover 200. Moreover, by closely conforming to the shape of the meter 100, the housing 1 may not require spacers 6 to prevent the housing 1 from being dislodged from the meter 100.

Referring now to FIG. 5, an embodiment of the invention is illustrated with a T-shaped antenna 27 engaged with housing 1, which can then be engaged with meter 100. The T-shaped antenna 27, as embodied by the invention, may have first, second, and third ends 31, 33, and 35 respectively. The T-shaped antenna 27 is insertable into an antenna aperture recess 9. The first end 31 of the T-shaped antenna 27 may be insertable through antenna aperture 7 into antenna aperture recess leg 9'. The second end 33 and third end 35 of the T-shaped antenna 27 are located opposite of each other. The second end 33 and third end 35 of the T-shaped antenna 27 may engage with corresponding into antenna aperture recess legs 9". Engagement of the second end 33 and third end 35 with the corresponding recess in antenna aperture recess legs 9" and is accomplished by inserting the second end 33 in and then inserting the third end 35 into another side, or vice versa.

Although T-shaped antenna 27 is constructed of somewhat flexible material, for this insertion process to be possible, the first end 31 of the T-shaped antenna 27 may be mobile within antenna aperture 7. Moreover, the recess side wall apertures 9 may also be formed from somewhat flexible material so the insertion process to be further facilitated. The mobile mounting can facilitate insertion of the T-shaped antenna's 27 second and third ends, 33 and 35 respectively, into the recess side wall apertures 9. This mounting provides a distance between the second and third ends of the T-shaped antenna 27, which can be greater than the distance between recess sidewalls 11.

Figure 6:
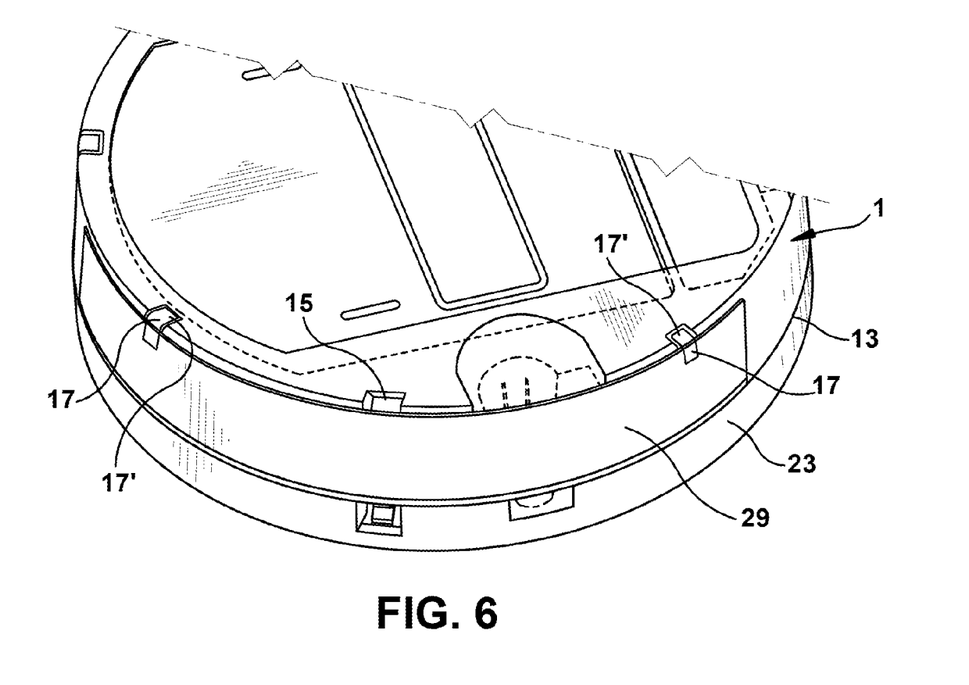
FIG. 6 is an exploded view of strip antenna mounted according to an embodiment of the invention.

Referring now to FIG. 6, another exemplary embodiment of the invention is illustrated. The antenna attachment scheme of FIG. 6 comprises a strip antenna 29 (also illustrated in FIG. 3) that is engaged with housing 1. The strip antenna 29 may be constructed of flexible material so that it can conform to the shape of the housing 100. Strip antenna 29 may also have a first side and a second side opposite the first side, where the first side may be engageable with flange 13 of the housing 1. In this embodiment, the first side of strip antenna 29 may be secured through the use of flange 13 alone, or with the aid of a tab 17. The tab 17 may freely rotate about its integral hinge 17' and engage with the second side of strip antenna 29. Thus, a strip antenna 29 is secured in between tab 17 and flange 13 to the side surface 4 of the housing 1.

Figure 7:
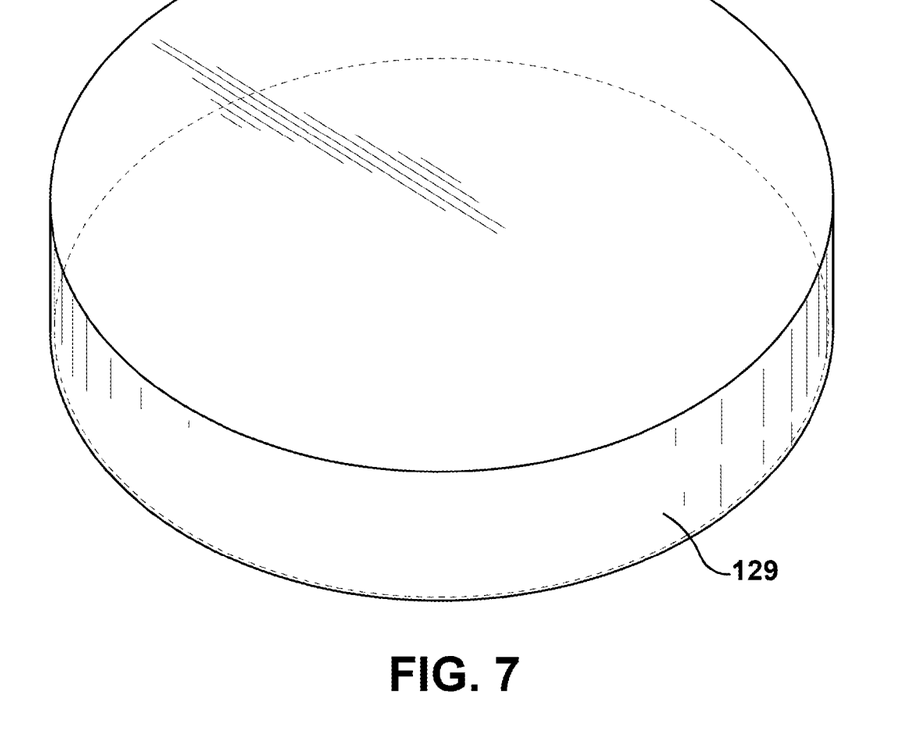
FIG. 7 is a further aspect of a strip antenna in the antenna attachment scheme, as embodied by the invention

FIG. 7 is a further aspect of the strip antenna 129 in the antenna attachment scheme, as embodied by the invention. In FIG. 7, the strip antenna 129 comprises a complete circular periphery. When the strip antenna 129 comprises a complete circular periphery, the strip antenna 129 fully envelops the housing 1. The strip antenna 129 fits on the flange 13 in a similar manner as described above and can be secured to the housing 1 also as described above.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

From the above description of at least one aspect of the invention, those skilled in the art will perceive improvements, changes and modifications. Such improvements, changes and modifications within the skill of the art are intended to be covered by the appended claims.

What is claimed is:

1. An antenna attachment scheme for mounting an antenna to
a meter, the antenna attachment scheme comprising:
a housing mountable to a meter, the housing comprising:
a top surface;
an open-end; and
a side surface; wherein the side surface of the housing comprising a mounting surface for the antenna to the housing and the side surface comprising a flange for mounting the antenna to the housing.

2. The antenna attachment scheme for mounting an antenna to a meter of claim 1, wherein the antenna comprises a strip antenna.

3. The antenna attachment scheme for mounting an antenna to a meter of claim 2, wherein the strip antenna is configured to extend between about ¼ of a periphery of the side surface of the housing to fully encapsulating the periphery of the side surface of the housing.

4. The antenna attachment scheme for mounting an antenna to a meter of claim 2, wherein the strip antenna is configured to fully encapsulate the periphery of the side surface of the housing.

5. The antenna attachment scheme for mounting an antenna to a meter of claim 1, further comprising a tab, the tab comprises an integral hinge for securing the antenna to the housing.

6. The antenna attachment scheme for mounting an antenna to a meter of claim 1, wherein the top surface of the housing comprises a top surface aperture allowing viewing of the meter through the top surface of the housing.

7. The antenna attachment scheme for mounting an antenna to a meter of claim 1, further comprising a meter top cover, the meter top cover being disposed over the housing, the meter top cover comprising a meter top cover top surface, a meter top cover side surface, and a meter top cover bottom surface, the meter top cover nesting over the housing.

8. The antenna attachment scheme for mounting an antenna to a meter of claim 7, the housing further comprising at least one spacer, the at least one spacer positioning the meter top cover from the housing.

9. The antenna attachment scheme for mounting an antenna to a meter of claim 1, wherein the side surface of the housing further comprises a recess for mounting the antenna.

10. The antenna attachment scheme for mounting an antenna to a meter of claim 9, wherein the recess is provided in the side surface of the housing, and the recess comprises an antenna aperture.

11. The antenna attachment scheme for mounting an antenna to a meter of claim 10, wherein the antenna aperture comprises antenna aperture recess legs in a configuration to receive a T-shaped antenna.

12. An antenna attachment scheme for mounting an antenna to a meter, the antenna attachment scheme comprising:
a housing mountable to a meter, the housing comprising:
a top surface;
an open-end; and
a side surface; wherein the side surface of the housing comprising a mounting surface for the antenna to the housing;
wherein the side surface of the housing further comprises a recess for mounting the antenna and the side surface comprising a flange for mounting the antenna to the housing and the antenna comprises a strip antenna.

13. The antenna attachment scheme for mounting an antenna to a meter of claim 12 the recess comprises an antenna aperture, wherein the antenna aperture comprises antenna aperture recess legs in a configuration to receive a T-shaped antenna.

14. The antenna attachment scheme for mounting an antenna to a meter of claim 12, wherein the strip antenna is configured to extend between about ¼ of a periphery of the side surface of the housing to fully encapsulating the periphery of the side surface of the housing.

15. The antenna attachment scheme for mounting an antenna to a meter of claim 14, wherein the strip antenna is configured to fully encapsulate the periphery of the side surface of the housing.

16. An antenna attachment scheme for mounting an antenna to a meter, the antenna attachment scheme comprising:
a housing mountable to a meter, the housing comprising:
a top surface;
an open-end; and
a side surface; wherein the side surface of the housing comprising a mounting surface for the antenna to the housing
wherein the side surface of the housing further comprises a recess for mounting the antenna, and the side surface comprising a flange for mounting the antenna to the housing and the antenna comprises a strip antenna, and the recess is provided in the side surface of the housing, and the recess comprises an antenna aperture, wherein the antenna aperture comprises antenna aperture recess legs in a configuration to receive a T-shaped antenna.

* * * * *